United States Patent [19]

Dormans

[11] 3,924,187

[45] Dec. 2, 1975

[54] TWO-WAY CABLE TELEVISION SYSTEM WITH ENHANCED SIGNAL-TO-NOISE RATIO FOR UPSTREAM SIGNALS

[75] Inventor: Paul M. Dormans, Fort Wayne, Ind.

[73] Assignee: The Magnavox Company, Fort Wayne, Ind.

[22] Filed: May 14, 1974

[21] Appl. No.: 469,713

[52] U.S. Cl. ........... 325/52; 178/DIG. 13; 325/308; 340/147 SY

[51] Int. Cl.² ........................................... H04B 3/04

[58] Field of Search .......... 178/DIG. 13; 179/170 R, 179/170 A; 340/147 R, 151, 147 SY, 147 C, 183, 408; 325/308, 478, 52

[56] References Cited

UNITED STATES PATENTS

| | | | |
|---|---|---|---|
| 2,844,714 | 7/1958 | Cardon et al. | 325/478 |
| 3,255,306 | 6/1966 | Campbell et al. | 178/DIG. 13 |
| 3,668,307 | 6/1972 | Face et al. | 178/DIG. 13 |
| 3,750,022 | 7/1973 | Curry et al. | 178/DIG. 13 |
| 3,786,424 | 1/1974 | McVoy et al. | 340/151 |
| 3,846,703 | 11/1974 | Stewart et al. | 178/DIG. 13 |
| 3,886,454 | 5/1975 | Oakley et al. | 325/52 |

*Primary Examiner*—George H. Libman
*Attorney, Agent, or Firm*—Joe E. Barbee; Thomas A. Briody; William J. Streeter

[57] ABSTRACT

A cable television system having a bidirectional, downstream and upstream, signal transmission network capable of providing downstream signal paths between a central station and each of a plurality of subscriber terminals simultaneously with upstream signal paths between each of the subscriber terminals and the central station, utilizes controllable signal gates in series with the upstream paths. Each gate is associated with one or more of the subscriber terminals and a portion of the upstream network common thereto. Each gate is activated at appropriate times to allow transmission of upstream signals from the subscriber terminals to the central station; and at other times, to isolate both the subscriber terminals and the common network portion from the remainder of the system's upstream network and the central station without affecting the transmission of downstream signals to the subscriber terminals. The system operates for providing a reduction in the level of undesired noise which normally accompanies desired upstream signals to the central station by reducing the number of noise contributing sources in the system's upstream network. Certain subscriber terminals and portions of the upstream network which are not, at the time, active in upstream signal transmission are removed from the upstream network. Activation of the gates can be controlled by the presence of an actual upstream signal at each gate or by other types of either downstream or upstream signals which are indicative of, or referenced to, time periods during which it is desirous to have the gate activated.

3 Claims, 9 Drawing Figures

TWO-WAY CABLE TELEVISION SYSTEM WITH ENHANCED SIGNAL-TO-NOISE RATIO FOR UPSTREAM SIGNALS

CROSS REFERENCE TO RELATED APPLICATIONS

The present invention may be utilized advantageously in two-way cable television systems, one type of which is disclosed in U.S. patent application Ser. No. 522,795 filed Nov. 11, 1974 which is a continuation-in-part of Ser. No. 328,818, filed Feb. 1, 1973, now abandoned, in the names of Luther W. Ricketts and Paul M. Dormans entitled "Premium Interactive Communication System" and assigned to the assignee of the present invention.

BACKGROUND OF THE INVENTION

1. Field of the Invention

This invention relates to cable television systems and more particularly to those systems having a two-way or bidirectional signal transmission capability and can include such systems commonly referred to as community antenna television (CATV) systems, closed circuit television (CCTV) systems, and wired program and/or data distribution or communication systems.

2. Description of the Prior Art

In a two-way or bidirectional CATV system, signals can be transmitted in a downstream direction from a central station or head-end to a plurality of subscriber or satellite terminals and also in an upstream direction from the subscriber terminals to the central station. The system's signal transmission or distribution network provides both downstream and upstream signal paths and may utilize either a common or separate cable network for each direction of transmission.

In a two-way system, the upstream signals, which are those originating at one or more of the subscriber's locations, are transmitted via the cable network to the central station whereupon they are detected and processed for further use. Unfortunately, in such a system and especially in one having a sufficient number of subscribers to make it profitable to operate, the upstream signals arriving at the central station are ordinarily greatly degraded because of high noise levels existing in the upstream distribution network. This is true regardless of whether the downstream and upstream signals use a common cable network or separate cable networks.

Any electrical disturbances existing in the upstream network and having frequencies within the useful upstream frequency band are considered to be noise and are undesirable. These electrical disturbances can include broadband random type noise as well as spurious R.F. signals having discrete frequencies.

Such disturbances or noise can be introduced into various portions of the cable network itself from sources external to the system. As an example, noise can be introduced into the subscriber's drop lines from external noise sources. Since the subscriber's drop lines constitute that portion of the cable network entering the subscriber's premises, they are potential pickup devices for noise generated and radiated at each subscriber's location from electronic or electrical equipment foreign to and separate from the CATV system. Noise can also be generated within the system network itself by, for example, the line amplifiers and each individual subscriber terminal which includes the upstream and downstream signalling equipment and associated television receivers. In addition, any other subscriber equipment which is interfaced with the CATV network, such as data read out or data input devices, keyboards, and etc., are potential noise sources and can contribute to the noise existing in the network.

The random broad band noise, as well as any incoherent spurious R.F. signals having substantially identical frequencies, which is supplied to the network from each of the many noise sources, can produce cumulative effects in the network. Since, as described above, each subscriber drop line and terminal equipment is an individual source of such undesired noise, each contributes to the overall noise power input to the complete system and hence the upstream noise problem becomes progressively worse as the system size and the number of subscribers increases. In addition, the noise from these individual sources has the potential of being increased in level by the various network upstream line amplifiers before reaching the upstream signal receiving point or central station. The spurious R.F. signals can also be mixed by any non-linearity in the network which can create additional undesired noise including modulation or mixing products. This of course further complicates the satisfactory reception and detection of the desired upstream signals.

In prior art two-way CATV systems in which the subscriber terminals are at all times connected to the upstream network, the total noise power in the network is for all practical purposes, a multiplication function of the total number of subscribers in the system. This is because the major portion of the upstream noise is normally generated by or associated with the subscriber terminal. Downstream broadcast signal to noise is not complicated by the total number of subscribers in the system because the downstream signal is confined to direct path conditions between the single central station and the subscriber terminals and the noise generated by the subscriber terminals and supplied to the upstream network cannot normally become part of the downstream signals. This is due to the frequency discriminatory isolation provided by the bidirectional line amplifiers existing between various of the subscriber terminals in the network. Thus, the signal-to-noise ratio conditions of upstream and downstream transmission are completely different and a subscriber's upstream signal is at a distinct disadvantage to compete with the total noise power contributed by all of the subscriber terminals in the system. In practice, in even a moderate size system, upstream signal transmission becomes impractical due to the high noise levels and the resultant poor signal to noise ratios. Because of this, it is apparent that for a given two-way system, there exists a maximum number of subscribers beyond which the noise and resultant signal to noise ratio for upstream signals becomes too great for practical and satisfactory operation.

One possible solution to the high upstream signal-to-noise ratio problem of a system having a large total number of subscribers is to separate or divide the overall upstream network and the associated subscriber terminals into a number of smaller individual networks each having its own signal receiving substation. The signal-to-noise ratio of the signals received at each such substation from its associated subscriber terminals is thus improved over that which would exist at the central station prior to such division because for each of the several substation networks the number of noise generating subscriber terminals associated with a given substation is less than the total number of subscriber terminals of the complete system. This does not represent an ideal solution, however, because the signal receiving equipment previously located at the central station must be duplicated, at least to a degree, at each substation which of course not only results in an increase in system cost but also in system complexity which is most generally accompanied by a decrease in system reliability. In addition, the signals or messages received by the substation from its associated subscriber terminals must in turn be relayed to the central station for further processing since a direct upstream signal transmission path between the subscriber terminals and the central station does not exist. Because a direct transmission path does not exist between the subscriber terminals and the central station, signal information from the subscriber terminals is not received by the central station simultaneously with its transmission from the subscriber terminals, i.e. it is not received in "real time" relationship to its generation. This is a disadvantage in systems where real time reception of upstream signals at the central station may be desired.

SUMMARY OF THE INVENTION

In view of the foregoing, it is an object of the present invention to provide a CATV system having improved signal-to-noise ratios for upstream signals.

It is also an object of the present invention to provide a simultaneous two-way CATV system in which certain portions of the upstream signal network are automatically removed from the overall upstream network when not being utilized for upstream signal transmission.

It is an object of this invention to provide an improved two-way CATV system in which one or more subscriber terminals are removed from the upstream signal network for improvement of upstream signal-to-noise ratio of subscriber signals at the central station without such removal affecting the flow of downstream signals to the said removed subscriber terminals.

It is another object of the present invention to provide a two-way CATV system in which the upstream signal-to-noise ratio is not directly related to, or a direct function of, the total number of subscribers in the system.

It is a further object of this invention to provide a CATV upstream signal network with an improved signal-to-noise ratio which is not dependent upon the use of one or more substations intermediate between the subscriber terminals and the central station.

It is still a further object of this invention to provide a two-way CATV system having an improved signal-to-noise ratio of upstream signals which are received at the central station in real time relationship to their transmission from the subscriber terminals.

It is another object of the present invention to provide a two-way CATV cable signal distribution network having controllable gates in the upstream signal paths between one or more subscriber terminal inputs and a central station output for selectively reducing the number of subscriber terminal inputs in the networks.

It is yet a further object of the present invention to provide an upstream signal gate which identifies the existence of upstream signals from one or more subscriber terminals and establishes an upstream signal path to the central station for the upstream signals.

It is still another object of this invention to provide an upstream signal gate which establishes an upstream signal path for one or more subscriber terminals connected thereto during time intervals which are assigned to the subscriber terminals for their transmission of upstream signals.

In accordance with the invention, certain portions of the upstream signal network having subscriber terminals connected thereto which do not at the time require an upstream transmission path are disconnected or isolated from the upstream signal network. The upstream network is thus "pruned" of certain of the inactive portions. As a result of this pruning, those subscriber terminals associated with the pruned portions of the network and which, prior to the pruning, contributed unnecessarily as noise sources to the network's total or summed noised, are disconnected from the upstream network. The total noise level existing in the upstream network is thus reduced and as a result, the signal-to-noise ratio of desired upstream signals at the central station or other upstream receiving point is greatly improved.

The upstream pruning is accomplished in various portions of the overall network by gating or effectively switching these portions and/or individual subscriber terminals "in" and "out" of the overall upstream system. In one embodiment, the gating or switching is controlled and activated automatically by the presence of an actual upstream signal in that particular portion of the network. In another embodiment, the gating or switching is controlled by either downstream or upstream signals which are indicative of, or referenced to, time slot periods which have been assigned to a particular subscriber terminal or group of terminals for the generation and/or transmission of upstream signals to the central station. In this later embodiment the controlling signals can be, for example, the downstream reference synchronizing signals disclosed in the aforementioned Ricketts et al. application. In this time slot organized system, each subscriber terminal generates and/or transmits upstream signals only during a predetermined time slot or assigned period of time. In the later embodiment of the present invention, the gate associated with one or more given subscriber terminals is activated to be closed for the passage of upstream signals only during those periods of time assigned to the associated subscriber terminal or terminals. Both of the above embodiments allow the uninterrupted flow of downstream signals to the subscriber terminals even though the subscriber terminals are removed from the upstream network.

The above operation and objects of the present invention as well as other objects, features, and advantages will become more apparent from the following description with reference to the accompanying drawings.

DESCRIPTION OF THE PREFERRED EMBODIMENT

Figure 1:
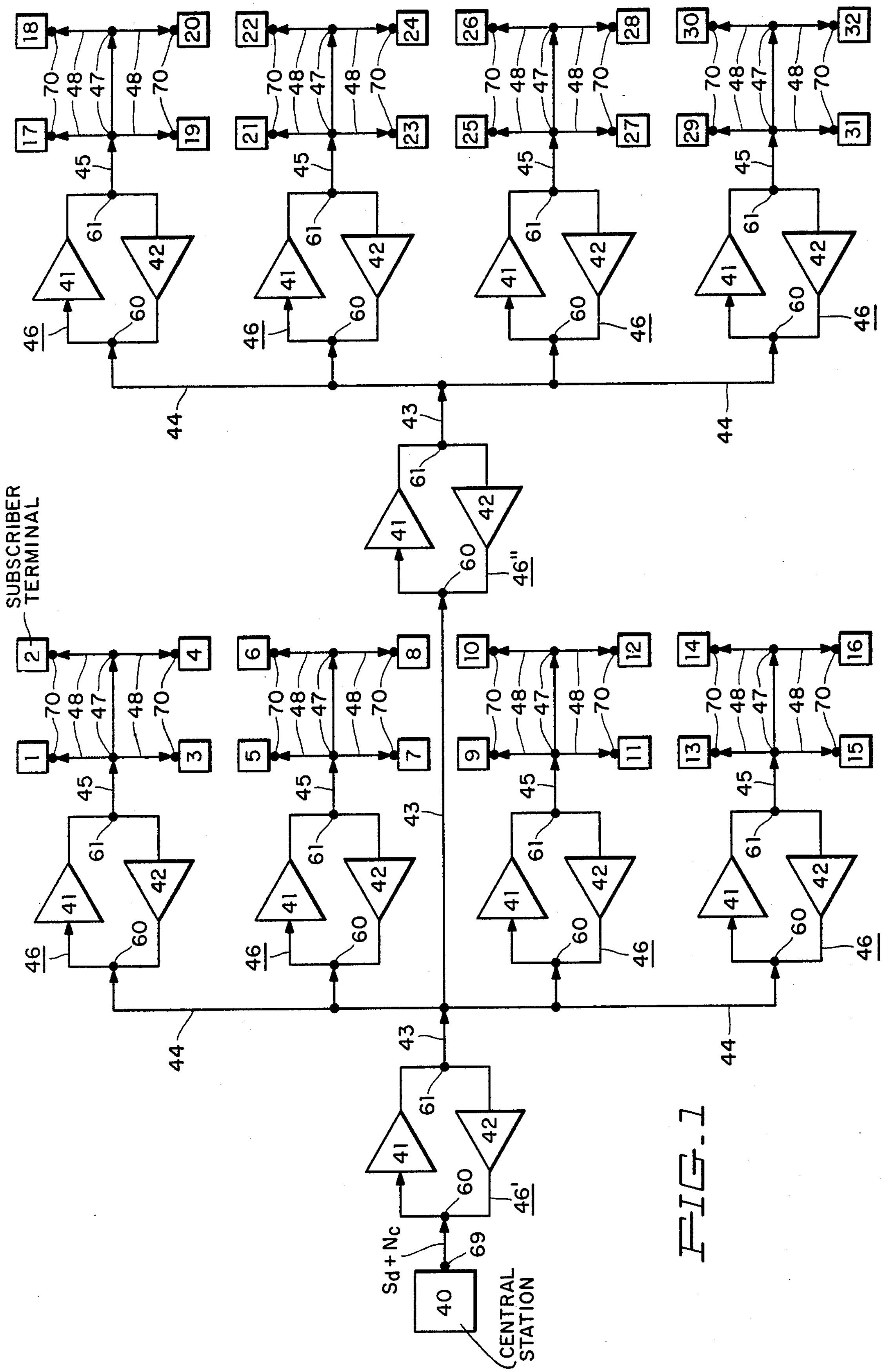
FIG. 1 is a simplified block diagram of a two-way CATV system and distribution network in which the present invention may be employed and illustrates the downstream signal flow conditions of signals originating at the central station and distributed to the subscriber terminals.
Figure 2:
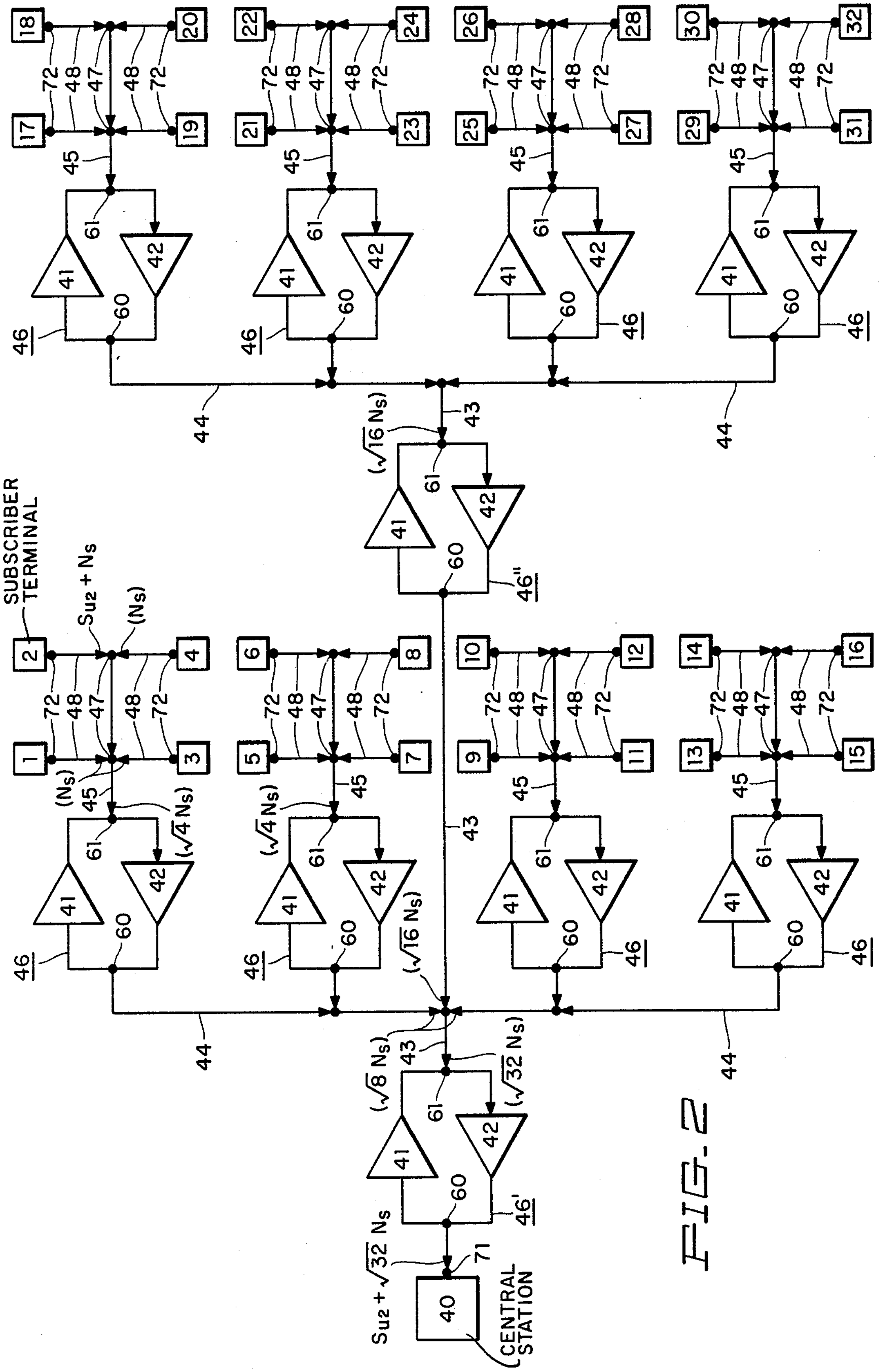
FIG. 2 is the same system and network of FIG. 1 illustrating the upstream signal flow conditions.

There is shown in FIGS. 1 and 2 a simplified block diagram of a two-way CATV system and signal distribution network in which the present invention can be employed. Although the present invention is applicable to other network configurations, as will be apparent to those skilled in the art, the specific network shown can be utilized to illustrate the operation of the invention for providing an improved signal to noise ratio for upstream signals. The networks shown in FIGS. 1 and 2 are one and the same, forming a bidirectional network capable of simultaneously transmitting both upstream and downstream signals. FIG. 1 illustrates the downstream signal flow conditions and FIG. 2 shows the upstream signal flow conditions with the direction of signal flow indicated by the arrow heads.

It will be noted that the network shown in FIGS. 1 and 2 resembles a "tree" in graph form. The network has a trunk line 43, branches 44, and multibranches 45. Downstream signals originate at the central station 40 located at the base of the trunk 43 and are distributed to the subscriber terminals 1–32 located at the tips of the multibranches 45. Upstream signals originate at the subscriber terminals 1–32 located at the tips of the multibranches 45 and flow to the central station 40 located at the base of the trunk 43.

Figure 3:
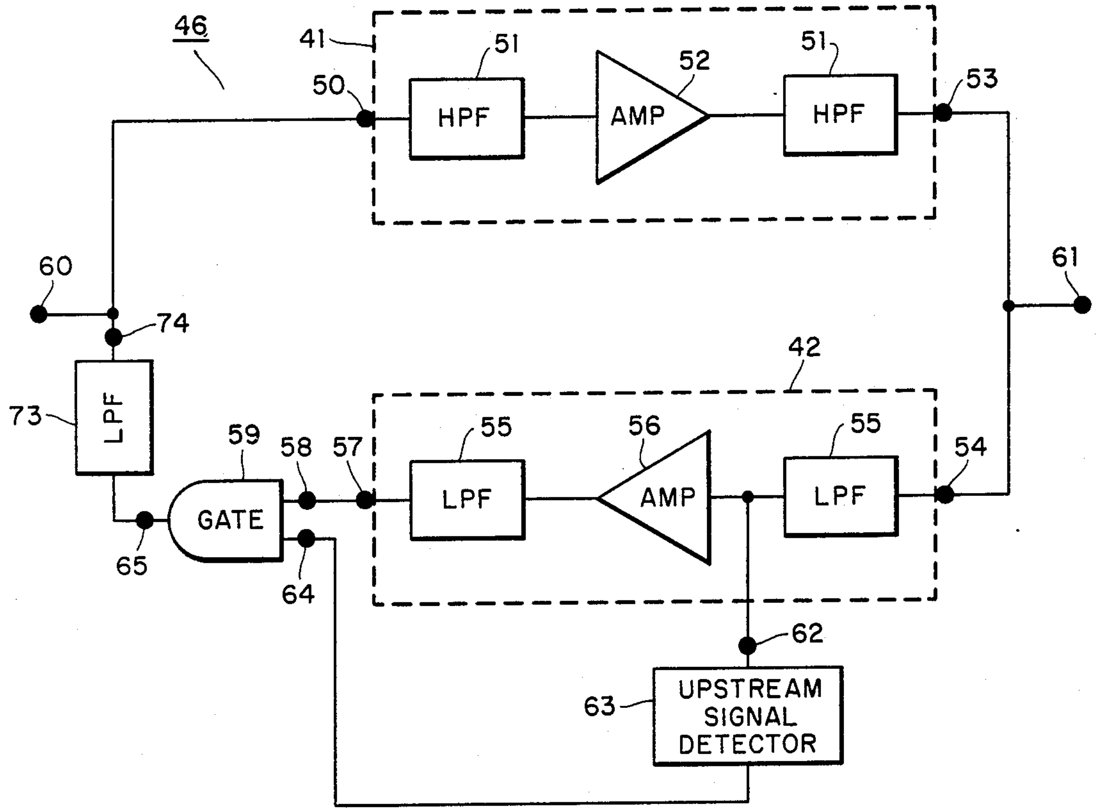
FIG. 3 is a simplified block diagram of a gated bidirectional line amplifier which, in accordance with one embodiment of the invention, can be used in the CATV system shown in FIGS. 1 and 2.
Figure 6:
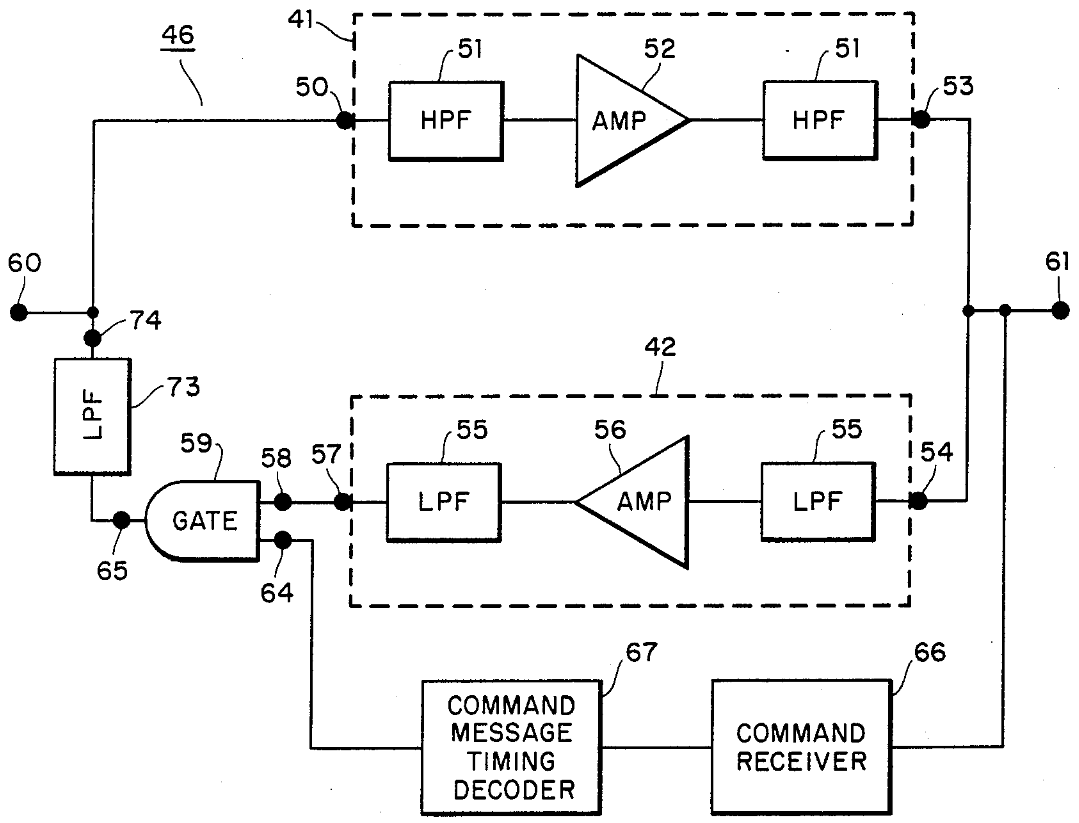
FIG. 6 is a simplified block diagram of a gated bidirectional line amplifier which in accordance with another embodiment of the invention can be used in the CATV system shown in FIGS. 1 and 2.

The bidirectional line amplifiers 46, 46′, and 46″, which are components of the system shown in FIGS. 1 and 2 and which are herein later described in more detail with relation to FIGS. 3 and 6, are all substantially the same and differ only in their placement or location in the network.

Referring first in detail to FIG. 1, a downstream signal $S_d$ (plus a noise $N_c$) which can consist of entertainment or program and information or data signals, originates at the central station or head end 40. This downstream signal $S_d + N_c$ is fed to the main trunk line 43 and through the downstream branches 41 of the bidirectional line amplifiers 46′ and 46″ to a plurality of branches 44. The branches 44 in turn, feed the signal $S_d + N_c$ to a plurality of multibranches 45. The multibranches 45 deliver the signal $S_d + N_c$ to a plurality of subscriber terminals 1–32 through the downstream branches 41 of the bidirectional line amplifiers 46 and the subscriber drop lines 48. The subscriber drop lines 48 couple the subscriber terminals 1–32 to the remainder of the system using conventional line couplers or taps 47. In such a downstream signal cable distribution or transmission network, there is one input or source node 69 and as many output or sink nodes 70 as there are subscribers and subscriber terminals. A node as referenced in this specification is considered to be a terminal or junction point in the network.

FIG. 2 illustrates the upstream signal network and upstream signal flow conditions. This network can be the same physical cable system used for the downstream signal transmission or if desired, may be a completely separate cable system. The upstream signals $S_u$ (plus a noise $N_s$), which can consist of information or data signals, originate at one or more of the subscriber terminals 1–32. These upstream signals $S_u + N_s$ are fed upstream to the central station 40 in a direction opposite to that previously described for the downstream signals $S_d + N_c$ except that the upstream signals $S_u + N_s$ flow through the upstream branches 42 of the applicable bidirectional line amplifiers 46, 46′, and 46″. Each of the subscriber terminals 1–32 can simultaneously or otherwise generate and/or transmit an upstream signal $S_u + N_s$ to the central station 40. The transmission of upstream signals $S_u + N_s$ from each of the subscriber terminals 1–32 can also occur simultaneously with the transmission of downstream signals $S_d + N_c$ from the central station 40 to the subscriber terminals 1–32. It should be noted that each of the subscriber terminals 1–32 can feed into the upstream network an undesired noise $N_s$, as previously described, regardless of whether or not the terminal is transmitting an upstream signal $S_u$, so long as the terminal is connected to the upstream network. Compared to the downstream network, the upstream signal cable distribution or transmission network has one output or sink node 71 and a plurality of input or source nodes 72.

It should be understood that the specific network shown in FIGS. 1 and 2 is for the purpose of illustrating the invention and that the location and number of subscribers terminals 1–32, bidirectional line amplifiers 46, 46′, and 46″, multibranches 45, branches 44, and trunk line 43, etc. need not be limited to that shown. In addition, in some network systems, the upstream signals which originate at the subscriber terminals 1–32 can be fed to one or more separate substations or intermediate sink nodes, each associated with preselected groups of subscribers, rather than directly to the single sink node 71 at the central station 40. The present invention can be utilized in the network between such substations and the central station 40 and/or between the subscriber terminals and substation.

Reference is now made to FIG. 2 for the purpose of illustrating how the total number of subscribers or subscriber terminals in the system affects the signal-to-noise ratio of an upstream signal $S_u$. In the following illustration, it will be assumed that there is a total of 32 subscribers and associated subscriber terminals 1–32 in the complete system. It will also be assumed that only one of the subscriber terminals, namely terminal 2, is transmitting an upstream signal $S_{u2}$ to the central station 40. It is further assumed that the undesired noise $N_s$ generated by each separate one of the subscriber terminals 1–32 (i.e. $N_{s1}$, $N_{s2}$, $N_{s3}$, etc.) is equal in level to each other. It should, however, be understood that these assumptions are for the purpose of illustration and that the invention is not limited thereto. Under these assumed conditions, the upstream signal from subscriber terminal 2 which is coupled and fed into the upstream network is then the desired signal $S_u$ plus the noise $N_s$ generated by subscriber terminal 2 or more specifically:

$$S_{u2} + N_{s2}$$

and the undesired noise $N_s$ coupled into the upstream network from each separate one of the remaining subscriber terminals 1, and 3–32 is equal in level to $N_{s2}$.

Since the noise $N_s$ generated by each one of the 32 terminals is most generally of a random or Guassian nature, the individual levels tend to add as the square root of the sum of the squares and therefore the total noise from all 32 of the subscriber terminals in this specific illustration becomes:

$$N_s\,(\text{total}) = \sqrt{(N_{s1})^2 + (N_{s2})^2 + (N_{s3})^2 \ldots (N_{s32})^2}$$

and since it was assumed that:

$$N_{s1} = N_{s2} = N_{s3} = \ldots = N_{s32}$$

then, the total combined noise in the upstream network is $$N_s\,(\text{total}) = \sqrt{32 N_s^2} = \sqrt{32} N_s$$

consequently, the upstream signal $S_{u2}$ from subscriber terminal 2 upon arriving at the central station 40 is combined with the total system noise and thus becomes:

$$S_{u2} + \sqrt{32} N_s$$

Thus, the total system noise is approximately 5.65 times greater than the noise $N_{s2}$ from subscriber terminal 2 alone. The relative levels of noise $N_s$, contributed by the subscriber terminals 1–32 and existing at various points in the upstream network of the above example are illustrated in FIG. 2 by those values enclosed within brackets.

If in accordance with the present invention, all or at least some of the subscriber terminals 1–32 which are at the time not participating in upstream signal generation or transmission are removed or isolated from the upstream network, it should now be apparent that the combined or total upstream noise level existing at the central station 40 will decrease. As an example, if each of the above multibranches 45 which are associated with the non-participating subscriber terminals 5–32 is isolated or removed from the upstream network by gating or switching, then the total number of noise source nodes 72 and related subscriber terminals in the upstream network is reduced from 32 to four. The four and only remaining subscriber terminal noise sources in the upstream network are then those subscriber terminals 1–4 associated with the multibranch 45 which is common with the active subscriber terminal 2. Under this condition, the signal $S_{u2}$, plus the combined noise is now:

$$S_{u2} = \sqrt{4} N_s$$

and when this is compared to the original signal plus the combined noise of:

$$S_{u2} = \sqrt{32} N_s$$

there is a reduction in system noise by a factor of:

$$\frac{\sqrt{32}}{\sqrt{4}} = 2.828$$

which ratio represents an improvement in signal to noise of better than +9db. Likewise, the theoretical improvement would be approximately +14db if the total number of subscriber terminals in the system were increased to 100 while maintaining four subscribers to each of a total of 25 multibranches.

The above network pruning concept may be extended to each individual subscriber terminal 1–32 with a result of even greater signal-to-noise ratio improvement. If each subscriber terminal 1–32 is isolated or pruned from the upstream network at those specific times when transmission of an upstream signal is not required, the previously illustrated signal to noise ratio improvements of 9 and 14 db would be increased to 14 and 20 db respectively since in the stated example, all subscriber terminals except terminal 2 would be removed from the upstream network.

FIG. 3 is a simplified block diagram of a gated bidirectional line amplifier 46 which in accordance with the present invention can be used in the network shown in FIGS. 1 and 2 as a gating means to isolate certain subscriber terminals from the upstream network. As previously stated, the bidirectional line amplifiers 46, 46′, and 46″ shown in FIGS. 1 and 2 are all substantially the same and differ only in their location in the network. Therefore, the following description will make reference only to the bidirectional line amplifier 46 unless otherwise noted. The bidirectional line amplifier 46, shown in FIG. 3, includes a downstream signal branch 41 through which downstream signals flow and an upstream signal branch 42 through which upstream signals flow. The terminals 60 and 61 of the bidirectional amplifier 46 are common to both the downstream and upstream signals. For downstream signals and signal flow conditions such as illustrated in FIG. 1, the downstream signal input and output terminals are terminals 60 and 61 respectively whereas, for upstream signals and signal flow conditions such as illustrated in FIG. 2, the upstream signal input and output terminals are terminals 61 and 60 respectively.

A signal gate or switch 59 is connected in series with the upstream signal path of branch 42. The signal gate 59 is controlled either to allow or to prevent signals and/or noise appearing on terminal 61 from being passed upstream through the upstream signal branch 42 to the upstream output terminal 60. When the signal gate 59 is activated to prevent such passage, the upstream signal input terminal 61 is effectively isolated or disconnected from the upstream signal output terminal 60. The bidirectional line amplifier 46 shown in FIG. 3 thus provides a unidirectional signal switch effective only for signals flowing in the upstream direction.

Figure 4:
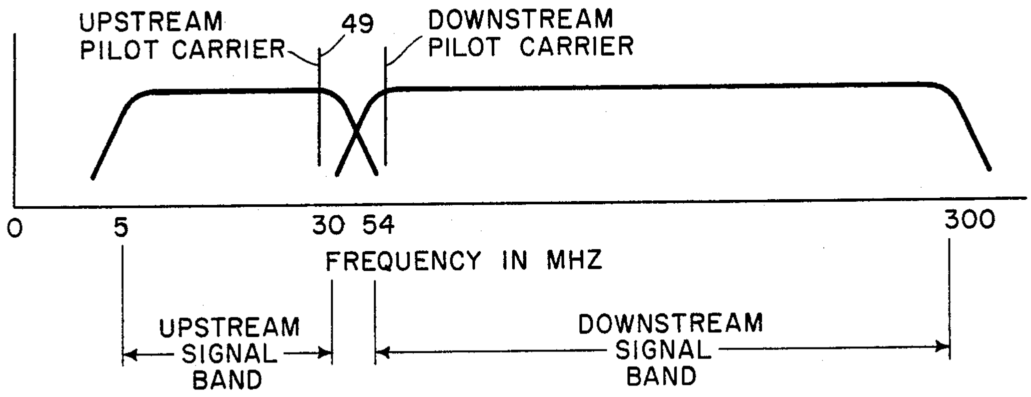
FIG. 4 illustrates by diagram the frequency allocation for the downstream and upstream signals which can be used in the CATV system of FIGS. 1 and 2.

The downstream signal branch 41 is conventional and consists of amplifier 52 and high pass filters 51, one each in the input and output of amplifier 52. These filters limit the overall downstream signal passband to any desired frequency band such as for example, that shown by FIG. 4. Likewise, the upstream branch 42 is conventional and consists of amplifier 56 and associated low pass filters 55 to limit the upstream passband such as also shown in FIG. 4.

It will be obvious to those skilled in the art that the above described high and low pass filters 51 and 55 shown in FIG. 3 and later in FIG. 6 are for the purpose of restricting the frequency passband of the downstream and upstream signal branches 41 and 42 to those frequencies utilized in the CATV system for the respective downstream and upstream signals. The filters 51 and 55 can therefore be other types in lieu of that specified and for example, can be bandpass type filters. In addition, these filters can be an integral part of the respective downstream and upstream amplifiers 52 and 56 in lieu of being separate components as shown schematically in FIGS. 3 and 6. As an example, the amplifier's tuned circuits can function as such filters. Thus, any signals within the passband of the downstream signal branch 41 and appearing on the downstream signal input terminal 60 will be passed to the output terminal 61. In a similar manner, signals within the required passband of the upstream signal branch 42 and appearing on the upstream signal input terminal 61 such as might arrive from the subscriber terminals, will be passed through the upstream signal branch 42 to the upstream output terminal 60 providing the signal gate 59 is activated to be in a closed or on condition. The amplifiers 52 and 56 allow signal flow only in the directions indicated since they are unidirectional devices. It is thus apparent that the downstream and upstream signals separated in frequency can be simultaneously passed in opposite directions by their respective downstream and upstream signal branches 41 and 42.

The remaining blocks shown in FIG. 3, consisting of an upstream signal detector 63 and a low pass filter 73, operate in combination with the signal gate 59 in series with the upstream signal branch 42 for providing isolation of terminal 61 from the upstream signal output terminal 60 when upstream signals are not present at terminal 61. In operation, an upstream signal $S_u$ at terminals 61 and 54 is passed through the amplifier 56 and its associated low pass filters 55 to the output terminal 57. This upstream signal is in turn supplied to an input terminal 58 of the signal gate or switch 59. The signal output of the low pass filter 55 which is in the input side of the amplifier 56 is also supplied to an input terminal 62 of the upstream signal detector 63.

The upstream signal detector 63 operates for providing an output signal to an enabling or gating signal input terminal 64 of the signal gate 59 whenever an upstream signal $S_u$ is present at the detector input terminal 62. An output signal is not supplied by the detector 63 when only a noise signal is present at the detector input terminal 62. The signal gate 59 operates to pass the upstream signal $S_u$ from the input terminal 58 to an output terminal 65 whenever an enabling signal is supplied to the enabling signal input terminal 64 from the upstream signal detector 63. Thus the aforementioned output signal from detector 63 will activate the gate 59 to be closed thereby causing the upstream signal $S_u$ which was supplied to the input terminal 58 of gate 59 to appear at the output terminal 65. The upstream signal $S_u$ appearing at terminal 65 is passed through a low pass filter 73 and applied to terminal 74. The low pass filter 73 provides isolation of the gate output terminal 65 from the downstream network and can be similar to the filters 55 or can be some other form of isolation well known in the art. The upstream signal $S_u$ from the low pass filter 73 and terminal 74 is in turn supplied to the upstream signal output terminal 60 of the bidirectional amplifier 46. Thus the bidirectional line amplifier 46 shown in FIG. 3 is capable of isolating the upstream signal input terminal 61 from the upstream signal output terminal 60 whenever upstream signals are not present at terminal 61 from any of the subscriber terminals 1–32.

The upstream signal detector 63 shown in FIG. 3 is capable of differentiating between an upstream signal $S_u$ and a noise $N_s$ and for example, can be simple diode carrier detector operating upon, or detecting the upstream pilot carrier 49 as shown in FIG. 4. A simple L-C pass filter tuned to the frequency of the pilot carrier 40 can be utilized in the signal detector 63 input circuit as a means to differentiate between the pilot carrier 49 and noise $N_s$ appearing at the input terminal 62. Thus an output signal from the carrier detector will be supplied to the signal gate enabling terminal 64 to activate the signal gate 59 to be in a closed condition whenever an upstream pilot carrier signal 49 is present at the input terminal 62 of the upstream signal detector 63.

The signal gate 59 shown in FIG. 3 and later in FIG. 6 is depicted schematically as a digital signal gate. This is done to simplify the understanding and operation of the invention. In actual practice, the gate or switch 59 must be capable of efficiently switching radio frequency signals when the upstream signals are of such nature. The signal gate 59 would therefore normally be an analog gating device and would have the capability of providing an analog signal switching or attenuation function between its respective input and output terminals 58 and 65. In moderately sized CATV systems, an attenuation of at least 60 db is desired between its input and output terminals in its open condition. It will be understood by those skilled in the art that the signal gate 59 must also provide sufficient isolation to upstream signals between the respective signal input and output terminal 58, 65 and the enabling signal terminal 64 to prevent a feedback path around, or any shunting effect upon the amplifier 56 or the branch 42 which might occur through the signal detector 63 of FIG. 3 or the decoder 67 and receiver 63 of FIG. 6. One such R.F. device suitable for use as the signal gate 59 is manufactured by RELCOM of Mountain View, Calif. It is a three terminal R.F. switch having an equivalent input terminal 58, output terminal 65, and an enabling or switching signal input terminal 64. One model referred to by RELCOM as its S-1 bridge type switch provides an on-off attenuation of, for example, 110 db at 1 MHz, 80 db at 300 MHz, and 70 db at 500 MHz.

In accordance with the invention, the signal-to-noise ratios of upstream signals at the central station are improved by selectively removing or isolating, from the upstream signal network, superfluous and noise contributing portions of the network including subscriber terminals which are not at the time of removal actively utilizing the upstream network. Such removal or isolation of these inactive network portions can be accomplished by any desired method of disruption of the appropriate upstream signal paths or attenuation of the upstream signals between the central station and the subscriber terminals. Methods and devices for disrupting the upstream signal path or attenuating the upstream signal other than the above described R.F. switch can be utilized and are within the scope and spirit of the invention and it should be understood that the signal gate 59 shown in FIGS. 3 and 6 is representative of any such device. As an example, the described function of the signal gate 59 can be provided by a gate amplifier which is well known in the art. Such an amplifier has an equivalent signal input terminal 58, output terminal 65, and enabling terminal 64. The amplifier operates to pass the input signal applied to terminal 58 to the output terminal 65 only during those time intervals when an enabling or gating signal is applied to the enabling terminal 64. At all other times, the amplifier exhibits a high attenuation between its signal input terminal 58 and output terminal 65. In such an approach, the amplifer can, for example, be gated or switched on and off by modulating or varying its gain. This can be accomplished by varying its operating bias and/or keying the amplifiers D.C. operating voltage on and off as a function of the enabling signal. The upstream signal amplifer 56 may itself be gated in the manner described above in lieu of using the signal gate 59 physically located as shown in FIG. 3 and later in FIG. 6. In this gated amplifier approach, the enabling or gating signal supplied to terminal 64 of gate 59 as shown in FIGS. 3 and 6 is now supplied to the gated amplifier to cause a variations in the amplifier's upstream signal gain or attenuation as a function of the enabling signal. The output of the upstream amplifier 56 when so gated is supplied directly to the upstream output terminal 57 and 60 through the low pass filter 55. The functions of the signal gate 59 and the amplifier 56 shown in FIG. 3 and later in FIG. 6 can be now combined by the gated upstream signal amplifier 56. The gate 59 and the low pass filter 73 schematically shown in FIGS. 3 and 6 can be replaced by the now gated amplifier 56 and its low pass filter 55.

It will be understood that the signal gate 59 can be positioned anywhere in the upstream signal branch of the bidirectional line amplifier 46 with the requirement being that it be capable of isolating the upstream signal input terminal 61 from the output terminal 60 as a function of the enabling signal on terminal 64. In addition, the upstream signal gating need not be accomplished within the bidirectional line amplifier 46. Although the line amplifiers form a convenient location for the described upstream signal network gating, the gating device can be separate from the bidirectional line amplifiers and can be placed anywhere desired in the upstream signal path of the network. It should also be understood that for the practice of the invention, the amplifiers 52 and 56 shown in FIG. 3 and later in FIG. 6 need not actually amplify the respective downstream and upstream signals. Either or both of these amplifiers can in fact, provide for an attenuation of the signals, i.e. they can provide a signal gain or a ratio of signal output level to signal input level of one or less as may be desired or required by other factors of the cable television system.

In the above described embodiment of FIG. 3, the command signals for activating the signal gate 59 via the signal detector 63 are supplied by the subscriber terminals in the form of, for example, the upstream pilot carrier 49 of FIG. 4. Other types of command signals can be utilized which can be generated and supplied either by the subscriber terminals 1–32 or by the central station 40. It is a generally preferred requirement that the gate 59 be in a closed condition whenever any subscriber terminal associated with that gate, is actually generating an upstream signal and thus requires an upstream signal transmission path to the central station 40 of other upstream signal receiving locations such as the previously described substation. There are, however, systems in which the present invention can be employed where improvement of the upstream signal-to-noise ratio can be realized even though certain of the gates 59 are activated to be closed during the time periods when no upstream signals are actually present for transmission upstream through that particular gate. As one example, in a time slot system such as described in the previously referenced Patent application of Ricketts et al., certain gates 59 can be activated to be closed during certain assigned time slot periods regardless of whether or not an actual upstream signal is present for transmission upstream. To illustrate this further, reference is made to the upstream network of FIG. 2. If each of the 32 subscribers shown therein have time slot periods assigned to them which are all different from one another and during which periods they can transmit upstream signals, then the gate 59 associated with the bidirectional line amplifier 46 of a given multibranch 45 would be activated to be closed with the capability of passing upstream signals during the time slot periods assigned to those subscriber terminals associated with that given multibranch 45 even though no upstream signals may be present from those subscriber terminals. All other multibranch gates 46 would be open during these specific time slot periods and the bidirectional line amplifiers 46′ and 46″located in the trunk lines 43 of FIG. 2 would be activated to be closed during the entire time period encompassed by the assigned time slots of those subscriber terminals whose upstream signals are common with that given bidirectional line amplifier. In addition, if upstream signal gates 59 are placed at each of the subscriber terminals 1–32 or in their respective drop lines 48 the gates 59 would be activated to be closed so as to pass upstream signals to the central station 40 only during the specific time slot period assigned to the respective subscriber terminal.

Figures 5A, 5B, 5C, 5D:
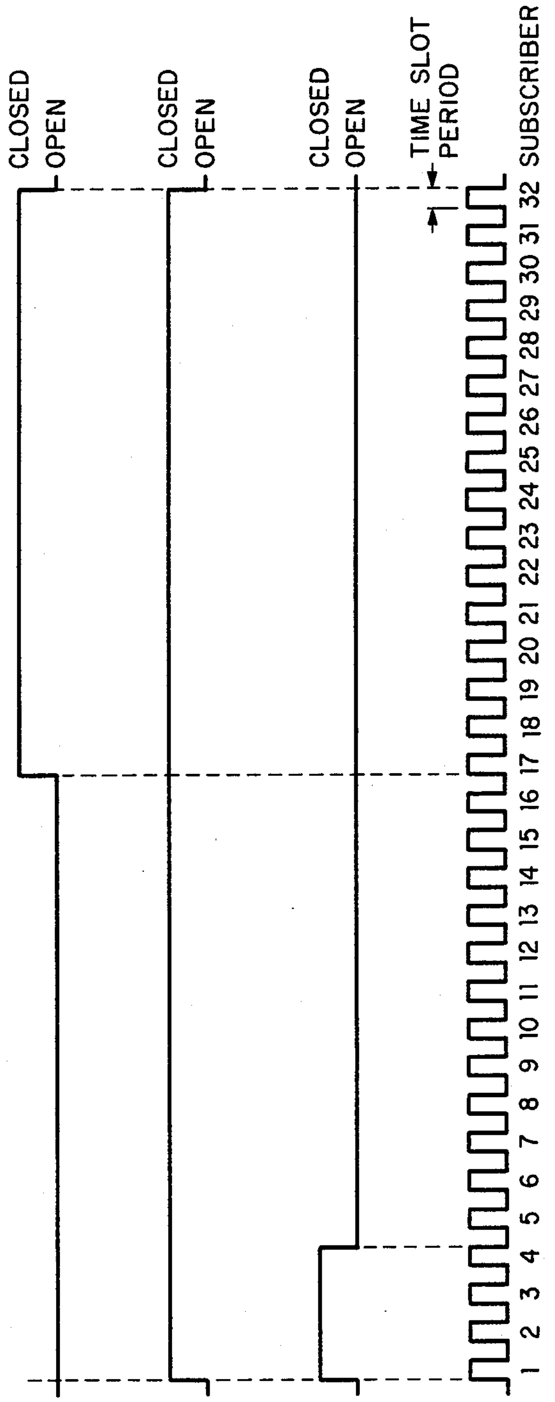
FIGS. 5(*a*) through (*d*) illustrate by diagrams one possible set of operating conditions for the various upstream signal gates in an embodiment of the present invention involving a time slot organized CATV system.

FIG. 5 illustrates one possible condition of the upstream signal gates 59 in the network shown in FIG. 2 in such a time slot organized system. The illustrations of FIGS. 5(*a*) through 5(*d*) are shown in time relationship to each other. FIG. 5(*a*) illustrates the individual time slot periods assigned to each of the 32 subscriber terminals, during which time it can generate and/or transmit upstream signals. FIG. 5(*b*) illustrates the condition of the upstream signal gate 59 such as might be located in the upstream signal branch of the bidirectional line amplifier 46 associated with the multibranch 45 and the group of subscriber terminals 1–4. FIG. 5(*b*) shows that this particular gate is activated to be closed, to allow passage of upstream signals, only during that total period of time encompassed by the individual time slot periods assigned to subscriber terminals 1–4. At all other times, the group of subscriber terminals 1–4 and that portion of the multibranch 45 between the subscriber terminals and the gate will be isolated from the remainder of the system's upstream network and the central station 40. In a like manner and although not specifically illustrated by FIG. 5, the signal gates 59 associated with each of the other network's multibranches 45 and their respective groups of subscriber terminals, i.e. 5–8, 9–12, 17–20, etc. will be activated to be closed only during the total period encompassed by the time slot periods assigned to their respective group of subscriber terminals. Thus in this particular example, only four subscriber terminals will be connected to the system's upstream network during any given time slot period. FIG. 5(*c*) illustrates the gating condition of the upstream signal gate 59 located, for example, in the upstream signal branch of the trunk line bidirectional amplifier 46′. This gate is activated to be closed during the entire time period encompassed by all 32 subscribers. FIG. 5(*d*) illustrates the gating conditions of the upstream signal gate 59 located for example in the upstream branch of the trunk line bidirectional amplifier 46″. This gate is activated to be closed for the passage of upstream signals only during the time period encompassed by the time slot periods assigned to subscriber terminals 17–32. At all other times, the subscriber terminals 17–32 as well as that portion of the upstream network between the gate 59 and the subscriber terminals 17–32 will be isolated from the remainder of the sysem's upstream network and the central station.

It is thus apparent in the foregoing FIG. 2 example, that during the assigned time slot period of any given subscriber, all other subscriber terminals would be isolated or pruned from the upstream network except those terminals associated with the multibranch 45 in which the given subscriber terminal is located. Of course, if such gating is utilized in each subscriber's drop line 48 or within each subscriber terminal, then all other subscriber terminals would be pruned from the upstream network and for any given time slot period, only that subscriber terminal assigned to that particular time slot would be gated or connected to the upstream network.

FIG. 6 is a simplified block diagram of a gated bidirectional line amplifier 46 which will enable the upstream signal gate 59 to be in a closed condition during predetermined time slot periods. It is suitable for use as a gating means in a time slot format system such as for example, that disclosed in the previously referenced Patent application of Rickets et al. The bidirectional line amplifier shown in FIG. 6 is identical to that amplifier shown in FIG. 3 except that the upstream signal detector 63 in FIG. 3 is replaced by a command receiver 66 and a command message timing decoder 67. The command receiver 66 detects and recovers the system's master clock timing pulses and reset signals which originate at the central station 40 and which are normally transmitted to all of the subscriber terminals 1–32 for time slot identification. The output of the command receiver 66 supplies clock and reset signals to the command message timing decoder 67 which is preset to recognize those time slot periods associated with the assigned time slots of all those particular subscriber terminals which are associated with and supplied by the specific bidirectional line amplifier 46 and connected to terminal 61. The output of the decoder 67 is used to activate the signal gate 59 in the upstream signal path or can be used, for example, to alternately key the amplifier 56 on and off as previously described. When the decoder is used to supply a gate enabling or activating signal to the enabling terminal 64 of gate 59, existing upstream signals at gate terminal 58 would be passed to output terminal 65 only during the assigned time slot periods for which the decoder 57 is preset.

In the above time slot embodiment of FIG. 6, the gating is associated with the subscriber assigned time slots rather than with the upstream pilot carrier or the actual upstream signal as was the case with the FIG. 3 embodiment and, as such, the gating of the upstream signal can be initiated by the time slot reference signals from the central station 40 which are normally transmitted downstream to each subscriber terminal 1–32 to establish each subscriber's assigned time slot. If the upstream signal path is gated at the subscriber terminals 1–32, the circuitry already present at the subscriber terminal for keying the upstream signal transmitter during the assigned time slot can be utilized to activate the upstream signal gate 59. Thus, the command signals for initiating the upstream gating can be supplied from the central station 40 or from the subscriber terminals 1–32.

From the foregoing, it will be seen that the present invention satisfies the objectives set forth herein and provides a simultaneous two-way CATV system which optimizes the signal-to-noise ratio of upstream signals received at the central station via the upstream signal network. The optimization is accomplished automatically as a continuous function of the number of subscribers in the system having need for the upstream signal network. The invention overcomes the high noise levels inherent in CATV upstream signal networks having a sizeable number of subscribers which has heretofor been a limiting factor in practical two-way systems. Although the invention has been described in relation to a CATV system, it has obvious application and utility in any cable connected communication system having a plurality of input terminals or source nodes.

Although the present invention has been described in relation to two particular embodiments, by way of example, it will be understood that they are illustrative of the invention and are not restrictive thereof. It is reasonable to expect that those having ordinary skill in the art can make numerous modifications and adaptations of the disclosed invention without departing from the spirit of the invention. It is intended that such modifications and adaptations of the invention will be within the scope of the following appended claims.

What is claimed is:

1. A two-way cable television system for providing an enhanced signal-to-noise ratio for upstream signals comprising: a bidirectional signal transmission network for providing simultaneous downstream and upstream signal paths and having a single downstream source node in common with a single upstream sink node and a plurality of downstream sink nodes in common with a plurality of upstream source nodes; first signal generating and receiving means connected to the common downstream source node and upstream sink node for providing transmission of downstream signals and a master reference signal and for reception of upstream signals; second signal generating and receiving means connected to each one of the common downstream sink nodes and upstream source nodes for providing transmission of upstream signals and reception of downstream signals, each one of said second signal generating means having a predetermined and different time period for the transmission of the upstream signals which time period is commenced by said master reference signal; and gating means associated with one or more of the second signal generating and receiving means and inserted in series into the signal path of the signal transmission network and controlled by the signals therein for gating the last mentioned one or more second signal generating and receiving means to the upstream signal path during said time period of each one of said one or more second signal generating means whereby there is a selective reduction of the number of second signal generating and receiving means connected to the upstream signal path and the first signal receiving means.

2. In a cable television system having a central station and a plurality of subscriber terminals, a signal transmission network interconnecting the central station and the subscriber terminals for providing downstream and upstream signal paths to and from the subscriber terminals and the central station, the system being capable of providing simultaneous transmission of downstream signals from the central station to the subscriber terminals and upstream signals from the subscriber terminals to the central station, each subscriber terminal being assigned to a predetermined and unique time slot period for the transmission of upstream signals, the downstream signals including a time slot reference signal for use by all the subscriber terminals to establish their predetermined time slot periods, the improvement comprising: means at the central station for transmitting downstream time slot reference signals to each of the plurality of subscriber terminals; means connected to the signal transmission network for receiving the transmitted time slot reference signals and including timing means responsive to the received signals for providing an enabling signal, said timing means adapted to provide said enabling signal only during the time slot periods assigned to a preselected one or more of the subscriber terminals; and means inserted in series into the signal paths of said last mentioned subscriber terminals and including a gating means responsive to said enabling signal for continuously providing a downstream signal path and for providing an upstream signal path only during the time slot periods assigned to said terminals.

3. A method of reducing the noise in an upstream signal network for enhancing the signal-to-noise ratio of upstream signals in a time slot organized two-way cable television system having a central station and a plurality of subscriber terminals interconnected by simultaneous downstream and upstream signal paths, the subscriber terminals having a predetermined time slot period for transmitting upstream signals, the predetermined time slot period being different for different subscriber terminals, the method comprising: transmitting a master timing reference signal; receiving the master timing reference signal at all bidirectional control units; generating at each bidirectional control unit upon receipt of the reference signal an enabling signal having a predetermined time interval corresponding to the said different time slot periods of said bidirectional control unit; and gating each bidirectional control unit to the upstream signal path during its predetermined time interval.

* * * * *